(12) United States Patent
Schwartz

(10) Patent No.: US 10,923,812 B1
(45) Date of Patent: Feb. 16, 2021

(54) WIRELESS TELECOMMUNICATIONS NETWORK

(71) Applicant: Chad Schwartz, Annandale, NJ (US)

(72) Inventor: Chad Schwartz, Annandale, NJ (US)

(73) Assignee: CCS Technologies LLC, Annandale, NJ (US)

(*) Notice: Subject to any disclaimer, the term of this patent is extended or adjusted under 35 U.S.C. 154(b) by 76 days.

(21) Appl. No.: 16/540,240

(22) Filed: Aug. 14, 2019

(51) Int. Cl.
| | |
|---|---|
| *H01Q 3/10* | (2006.01) |
| *H01Q 1/42* | (2006.01) |
| *H04W 40/28* | (2009.01) |
| *H01Q 3/38* | (2006.01) |
| *H01Q 1/40* | (2006.01) |
| *H01Q 21/26* | (2006.01) |

(52) U.S. Cl.
CPC .............. *H01Q 3/10* (2013.01); *H01Q 1/405* (2013.01); *H01Q 1/42* (2013.01); *H01Q 3/38* (2013.01); *H04W 40/28* (2013.01)

(58) Field of Classification Search
CPC ............ H01Q 3/10; H01Q 1/405; H01Q 1/42; H01Q 1/52; H01Q 1/425; H01Q 1/48; H01Q 3/38; H01Q 21/26; H01Q 1/44; H04W 40/28

USPC ......................... 343/703, 712, 725, 728, 788
See application file for complete search history.

(56) References Cited

U.S. PATENT DOCUMENTS

| | | | |
|---|---|---|---|
| 7,119,758 B2 | 10/2006 | Louzir et al. | |
| 9,413,078 B2 | 8/2016 | Leiba et al. | |
| 9,711,843 B2 | 7/2017 | Rogers | |
| 10,270,164 B2 | 4/2019 | Leiba et al. | |
| 2007/0287384 A1 | 12/2007 | Sadri et al. | |
| 2014/0227966 A1 | 8/2014 | Artemenko et al. | |
| 2018/0367199 A1* | 12/2018 | Zimmerman | ........ H01Q 25/001 |

* cited by examiner

*Primary Examiner* — Wei (Victor) Y Chan
(74) *Attorney, Agent, or Firm* — Thomas J. Germinario

(57) ABSTRACT

A telecommunications network comprises multiple nodes linked by line-of-sight (LOS) signals. Directional antennas are located outside concealment screens to avoid attenuation through multiple screening layers. Directional LOS aiming between nodes is accomplished by fully rotable radomes within which multiple antennas are contained or by rotation of gimbaled antennas within the radomes. Network architecture is configured for both azimuthal and elevational LOS antenna aiming, with redundancy to re-route around disabled nodes.

12 Claims, 4 Drawing Sheets

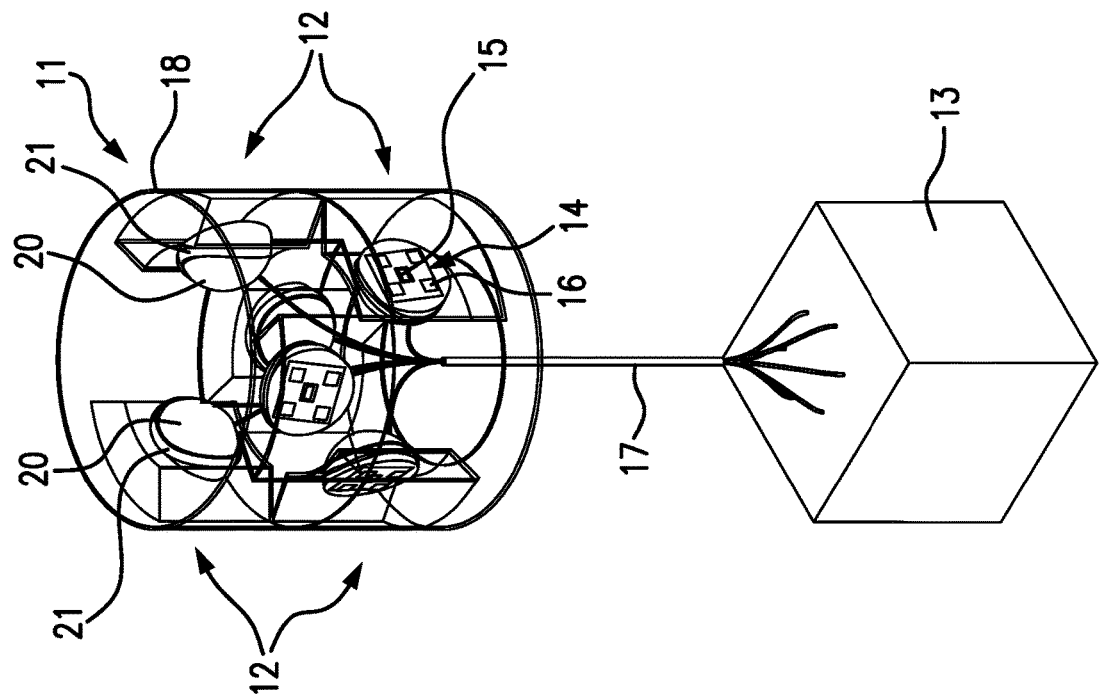
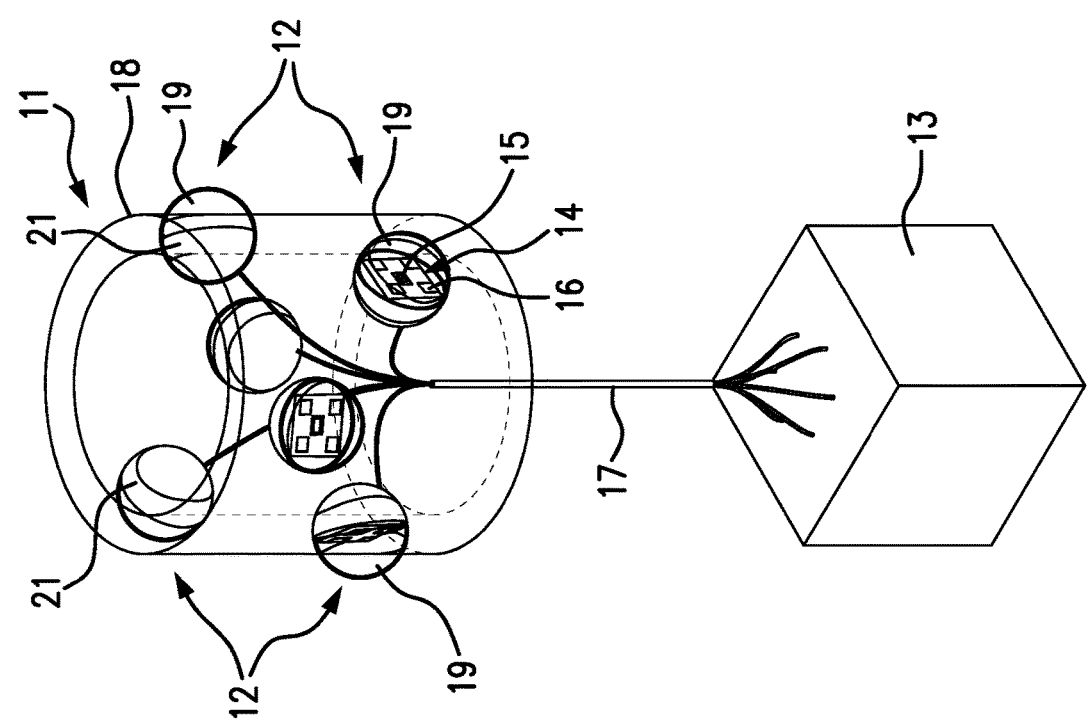

WIRELESS TELECOMMUNICATIONS NETWORK

FIELD OF INVENTION

The present invention relates generally to the field of wireless telecommunications networks including connectivity between radio equipment and end users, fronthaul and backhaul of data.

BACKGROUND OF THE INVENTION

Modern communications networks include connections between User Equipment (UE) and network equipment, connections between Centralized Radio Access Networks (C-RAN) and Base Band Units (BBU) located within a Central Office (CO), known as "Fronthaul", and connections between Base Transceiver Stations (BTS) and a CO, known as "Backhaul", where data can be connected to one or more internet service provider (ISP) networks. These connections may include wired, fiber optic and/or wireless components. Wireless sections can include cellular bands (~600 MHz-850 MHz and ~1900 MHz-2500 MHz) for 3G and 4G network communications with UE and microwave bands, including millimeter wave frequencies, to carry high-capacity wireless channels for 5G network connections to UE, fronthaul and backhaul purposes.

Higher frequencies have greater data capacity, relative to lower frequencies, and it is therefore advantageous to use the millimeter wave band, with wavelengths of 1-10 mm and corresponding frequencies of 30-300 GHz, for 5G UE connections, fronthaul and backhaul purposes. Antennas are furnished with a radome, to provide environmental and physical protection of the internal components. However, to conceal these antennas from view, it is often desirable to place the antennas behind a concealment shroud or panel. While radio waves at all frequencies experience some degree of attenuation when passing through a barrier, including its own radome, placing antennas with radomes behind additional panels to conceal them from view will always result in a loss of signal strength and/or quality. This result is not preferable at all frequencies but often creates unacceptable attenuation of millimeter waves. As such, screening of a millimeter wave transmitter/transceiver radios becomes problematic and screening of other frequencies is not preferable.

The ability to aim directional antennas, of all frequencies, is also critical for wireless connectivity design, allowing the wireless signal to be concentrated into the desired coverage area or precisely aligned between point-to-point (PTP) and point-to-multipoint (PTMP) links. Therefore, antenna configurations and network architecture need to be adopted to allow flexibility of both azimuthal and elevational aiming to create the desired wireless coverage for UE and between fronthaul/backhaul nodes.

SUMMARY OF THE INVENTION

The present invention is a telecommunications network having one or more types of wireless connections, including, but not limited to, UE coverage areas, fronthaul and backhaul. The wireless network comprises multiple network nodes, each of which contains one or more transceivers and/or transmitters, operating at one or more frequencies. Each of the transmitters/transceivers, in turn, comprises a Central Processing Unit (CPU), signal amplifier and a directional antenna, which may be separate components, electrically connected by one or more cables. In the case of millimeter waves, a CPU is electrically connected to an integrated circuit (IC) board with a signal amplifier and a directional antenna. The directional antenna/signal amplifier IC board is electrically connected to the CPU by a connection cable, which is preferably a USB cable. For lower frequencies, the CPU/signal amplifier, is electrically connected to a remote antenna with coaxial cables.

For aesthetic and security purposes, the signal amplifier/IC boards are screened from view by at least one concealment screen, which can be a flexible shroud or a rigid panel. In order to avoid unnecessary attenuation of the wireless signal, each of the directional antennas, within their respective radomes, is located outside the concealment screen, while remaining connected to the CPU by the connection cable that passes through the concealment screen. In this way, each of the directional antennas transmits and/or receives signals that do not pass through any one of the concealment screens.

The radome for each of the directional antennas is generally cylindrical or spherical in shape and contains one or more of the directional antennas. Each of the cylinders is rotatable to allow either azimuthal or elevational adjustments while each of the ball enclosures is set in a ball joint, so that the ball enclosure is fully rotatable through 360° in both azimuthal and elevational directions. Each of the cylindrical or ball enclosures is thereby configured to aim each of the directional antennas which it contains in a specified directional orientation, which directional orientation can be different for each of the directional antennas within each cylindrical or ball enclosures. Optionally, some or all of directional antennas within any one of the cylindrical or ball enclosures can be interchangeable with one or more replacement antennas, so that the antennas can be swapped out to change frequencies, technologies and/or coverage areas.

Alternately, the antenna components may be furnished without any radome and instead furnished in a partial cylindrical or partial spherical enclosure, leaving the antenna components exposed on the front of the enclosures. These partial cylindrical or partial spherical enclosures may be embedded into corresponding cylindrical or ball joint receptacles on the inside of the concealment screen, whereby the concealment screen itself becomes the radome, to provide the necessary environmental and physical protection for the antenna components. Therefore, the wireless signal does not pass through more than one radome or concealment screen.

In the fronthaul/backhaul portion of the network, the network nodes comprise point-to-point (PTP) nodes, point-to-multipoint (PTMP) nodes, or a combination of both. The fronthaul/backhaul nodes are configured in both azimuthal and elevational line-of-sight (LOS) relationship to each other, with LOS aiming accomplished by rotation of the radomes containing the directional antennas. Furthermore, each node may contain directional antennas intended to create coverage areas for UE. This network architecture enables the nodes to be advantageously located on a variety of supporting structures, such as buildings, traffic poles, light poles, and utility poles, so as to direct signals between adjacent nodes and coverage to specific locations within a building or streetscape.

In the event of failure or degradation of one or more fronthaul/backhaul network nodes, the network has multiple redundant fiber injection points and is configured to re-route signals around the failed/degraded nodes.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 1A is a perspective view of an exemplary transceiver/transmitter comprising a CPU electrically connected to multiple spherical radomes which extend through the concealment screen;

FIG. 1B is a perspective view of an exemplary transceiver/transmitter comprising a CPU electrically connected to multiple spherical radomes which are embedded in the concealment screen;

DETAILED DESCRIPTION OF THE PREFERRED EMBODIMENT

Figures 2A, 2B:
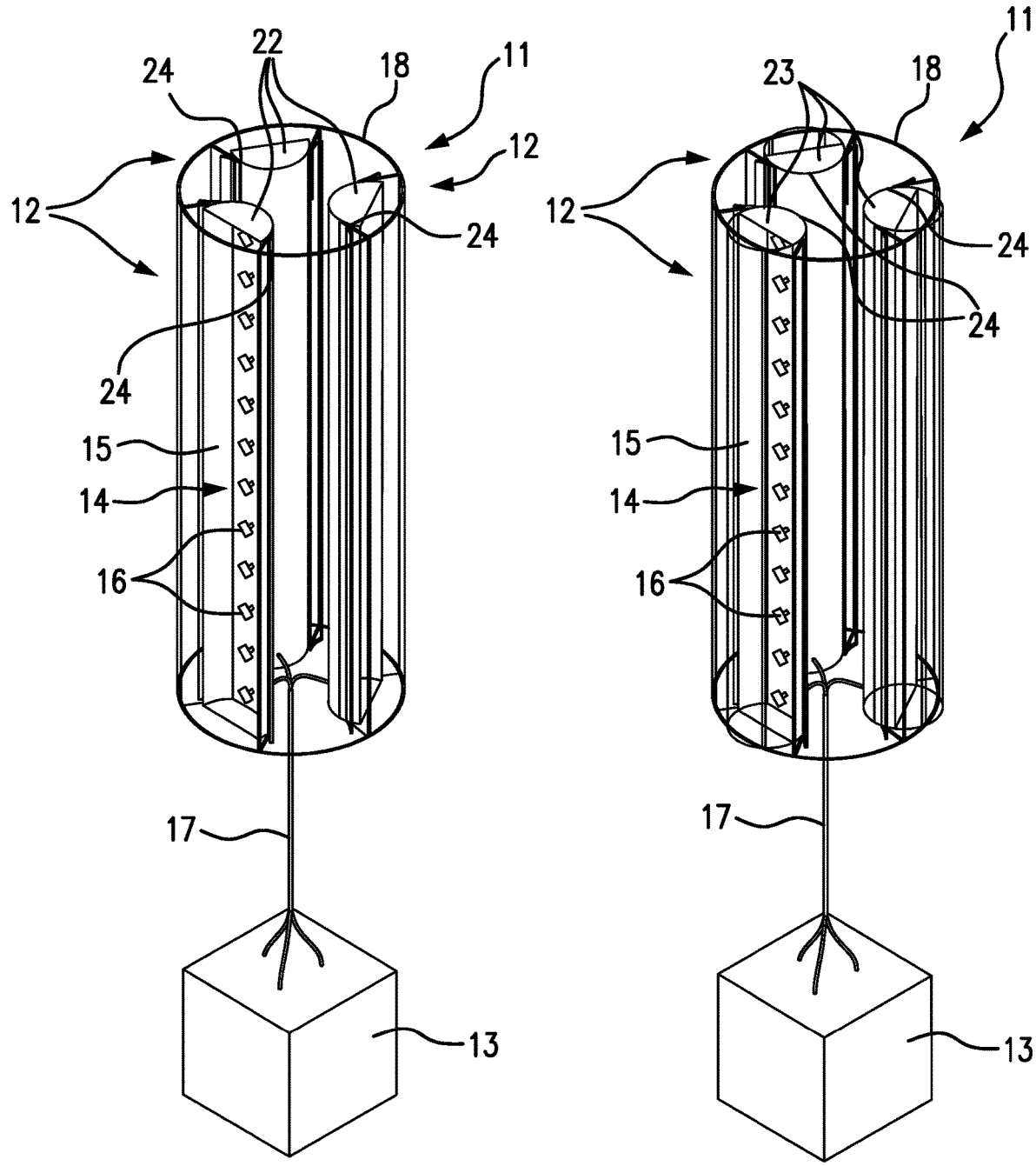
FIG. 2A is a perspective view of an exemplary transceiver/transmitter comprising a CPU electrically connected to multiple cylindrical radomes which are embedded in the concealment screen.
FIG. 2B is a perspective view of an exemplary transceiver/transmitter comprising a CPU electrically connected to multiple cylindrical radomes which extend through the concealment screen.

Referring to FIGS. 1A and 1B, exemplary network nodes 11 comprises multiple transceivers/transmitters 12, each of which comprise a CPU 13 and an IC board 14. In these exemplary network nodes 11, the multiple transceivers/transmitters 12 within each node all share the same CPU 13, but other embodiments can have more than one CPU 13 connected to the same node 11. Each IC board 14 comprises a signal amplifier 15 and one or more directional antennas 16, which are electrically connected to the CPU 13 by connection cables 17, preferably USB cables. In the exemplary network nodes 11, each connection cable 17 connects the CPU 13 to both the signal amplifier 15 and the directional antennas 16, but other embodiments can have the signal amplifier 15 and directional antennas 16 separately cabled to the CPU 13.

A concealment screen 18, which in these examples comprises a rigid tubular panel, partially surrounds the IC boards 14, leaving the directional antennas 16 exposed, so that signals to and from the antennas 16 do not pass through the concealment screen 18. In the embodiment shown in FIG. 1A, the IC boards 14, including the antennas 16, are fully enclosed within a closed spherical randome 19 which extends through the concealment screen 18. In the embodiment shown in FIG. 1B, the IC boards 14, including the antennas 16, are partially enclosed within an open spherical randome 20 which is embedded in the concealment screen 18. As referred to in the patent claims herein, both the closed spherical radome 19 and the open spherical randome 20 are designated simply as a "spherical radome."

Each of the spherical radomes 19 20 is embedded in a ball joint 21, which enables the radomes 19 20 to fully rotate through 360° in both the azimuthal and the elevational directions. As shown in FIGS. 1A and 1B, each of the radomes 19 20 contain multiple directional antennas 16, each of which has a different directional orientation, corresponding to a different coverage area. Optionally, each of the directional antennas 16 is interchangeable with one or more replacement antennas associated with different frequencies and/or coverage areas.

Figure 4B:
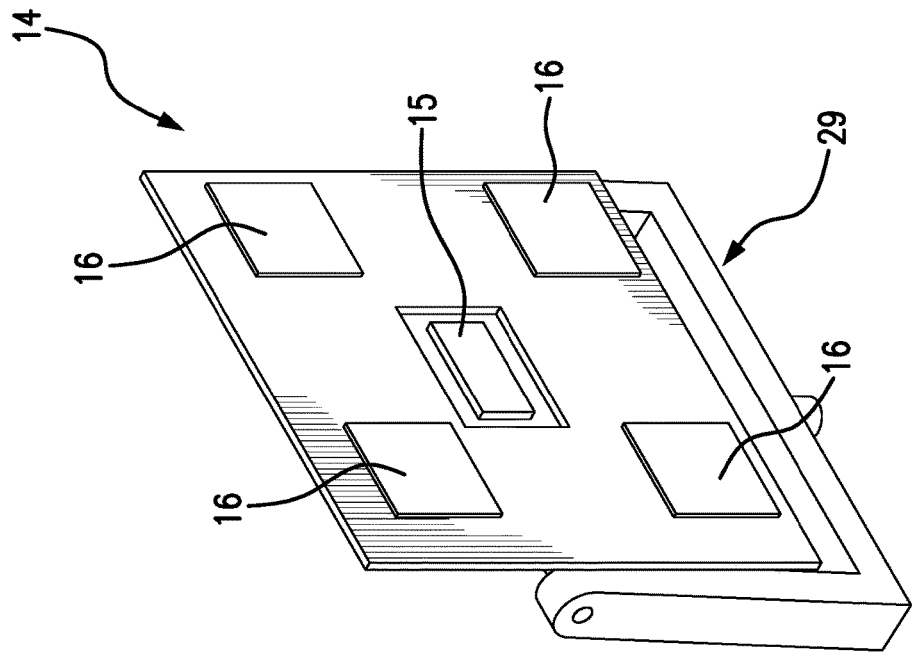
FIG. 4B is a detail perspective view of one of the IC boards depicted in FIG. 4A.
Figure 4A:
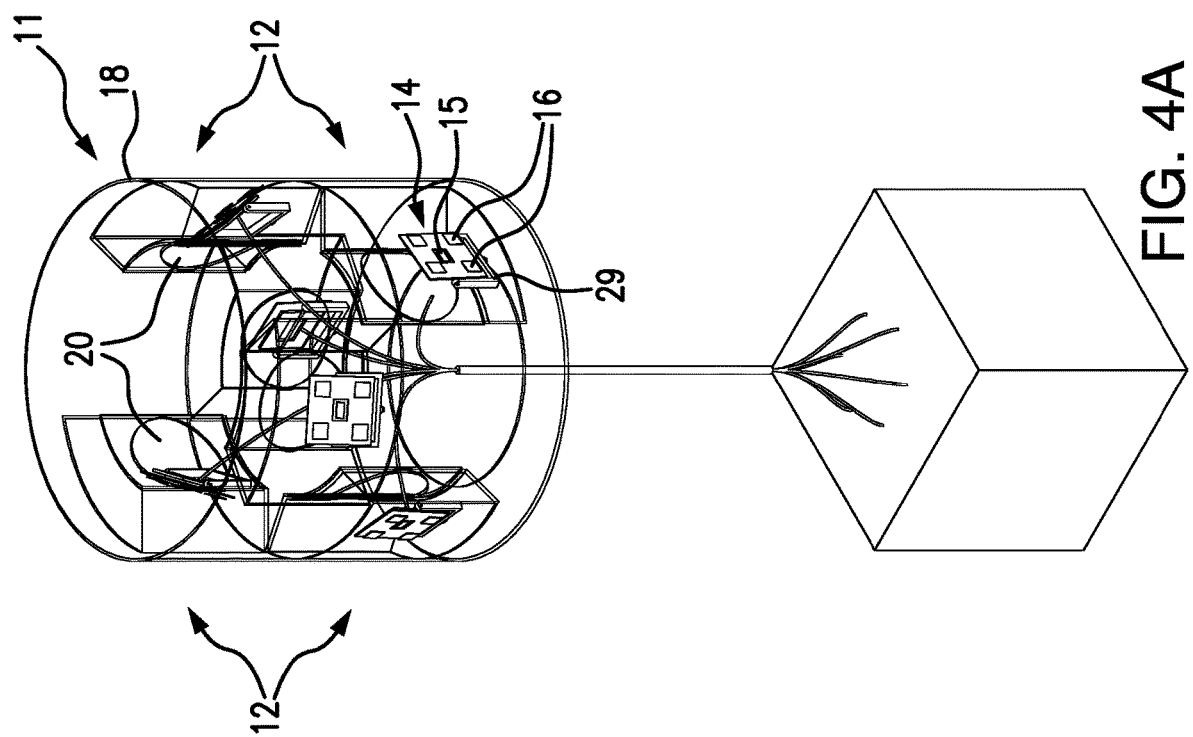
FIG. 4A is a perspective view of an exemplary transceiver/transmitter comprising a CPU electrically connected to multiple gimbaled IC boards within spherical radomes which are embedded in the concealment screen.

FIGS. 4A and 4B depict a third embodiment, in which the IC boards 14, including the antennas 16, are partially enclosed in an open spherical radome 20, as in FIG. 1B, but with the difference that the radome 20 does not rotate. Instead, the IC boards 14 are mounted on gimbals 29, having at least two axes of rotation, thereby enabling the IC boards 14 to fully rotate through 360° in both the azimuthal and the elevational directions. It should be understood that this gimbaled configuration can also be applied to the closed spherical radome 19 depicted in FIG. 1A.

Referring now to FIGS. 2A and 2B, two other exemplary network node embodiments 11 are illustrated. In the embodiment shown in FIG. 2A, the IC boards 14, including the directional antennas 16, are partially enclosed within an open cylindrical radome 22 which is embedded in the concealment screen 18. In the embodiment shown in FIG. 2B, the IC boards 14, including the antennas 16, are fully enclosed within a closed cylindrical radome 23 which extends through the concealment screen 18. As referred to in the patent claims herein, both the open cylindrical radome 22 and the closed cylindrical radome 23 are designated simply as a "cylindrical radome."

Each of the cylindrical radomes 22 23 is embedded in a cylindrical joint 24, which enables the radomes 22 23 to fully rotate through 360° in either the azimuthal or the elevational direction. As shown in FIGS. 2A and 2B, each of the radomes 22 23 contain multiple directional antennas 16, each of which has a different directional orientation, corresponding to a different coverage area. Optionally, each of the directional antennas 16 is interchangeable with one or more replacement antennas associated with different frequencies and/or coverage areas.

Figure 3:
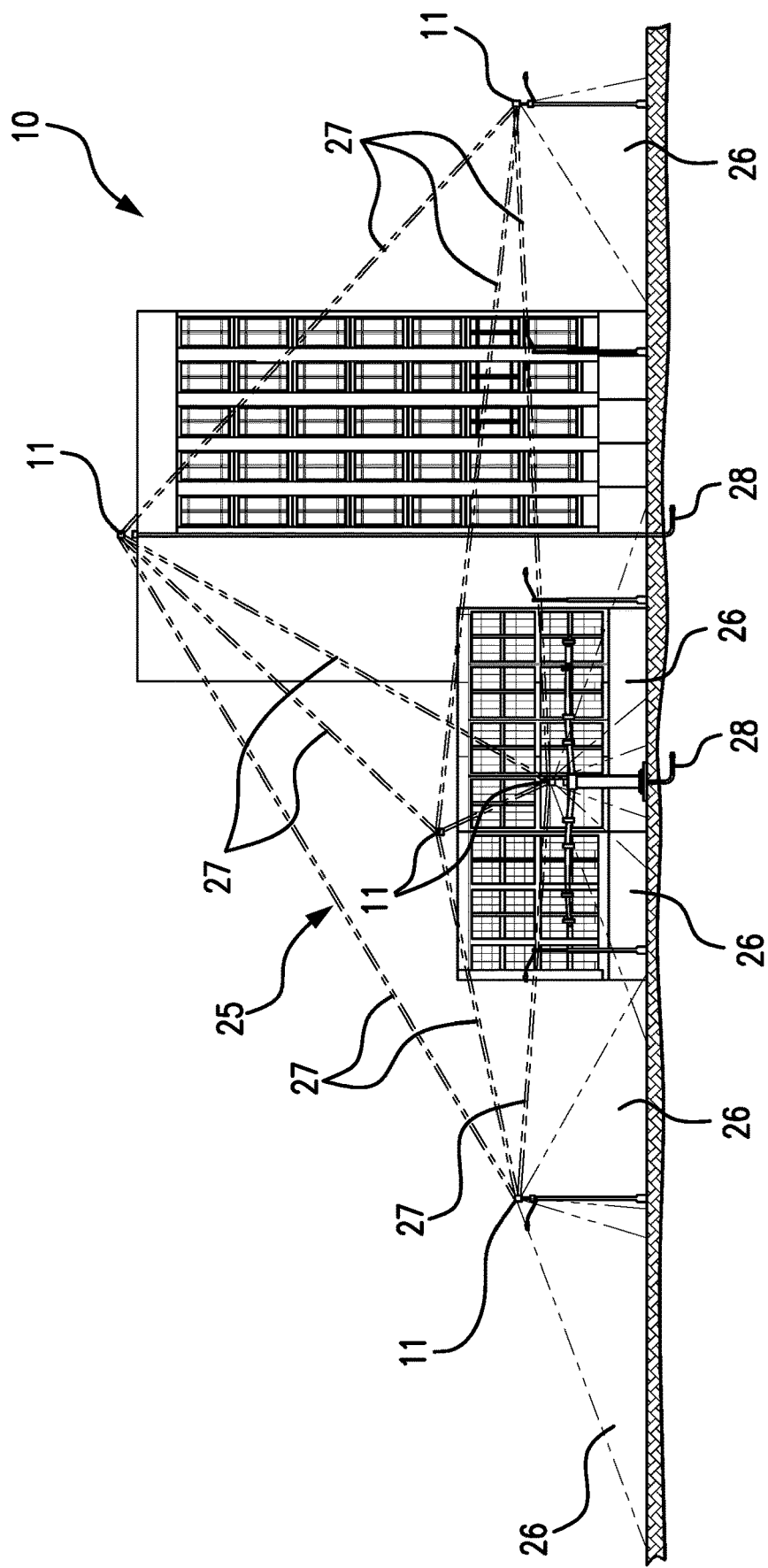
FIG. 3 is a schematic diagram of an exemplary network architecture, with re-routing redundancy, according to one embodiment of the present invention.

Referring now to FIG. 3, an exemplary telecommunications network 10 embodying the present invention is illustrated. The network nodes 11 comprise PTP nodes, PTMP nodes, or a combination of both. The fronthaul/backhaul nodes 11 are configured in both azimuthal and elevational LOS relationship 25 to one another, with LOS aiming between the nodes 11 accomplished by rotation of the radomes 19 20 22 23 containing the directional antennas 16 or by rotation of the IC boards 14 mounted on the gimbals 29. Each radome contains multiple antennas 16 which create multiple UE coverage areas 26. This network architecture 10 advantageously enables the nodes 11 to be located on a variety of supporting structures, such as buildings, traffic poles, light poles, and utility poles, so as to direct signals 27 between adjacent nodes and provide coverage areas 26 in specific locations within a building or streetscape. This network architecture 10 also features multiple redundant fiber injection points 28, which enable re-routing of signals 27 around failed or degraded nodes.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A telecommunications network comprising:
multiple network nodes, wherein each network node comprises one or more transceivers and/or transmitters, and wherein each of the one or more transceivers and/or transmitters comprises a central processing unit (CPU) and an integrated circuit (IC) board, and wherein the IC board comprises a signal amplifier and one or more directional antennas, and wherein the CPU is electrically connected by at least one connection cable to the directional antennas and the signal amplifier;
one or more concealment screens, wherein each concealment screen has a screen interior and a screen exterior, and wherein each of the IC boards is located at least partially within the screen interior of one of the concealment screens, and wherein each directional antenna is located in the screen exterior of each of the concealment screens, such that each of the directional antennas transmits and/or receives signals which do not pass through any one of the concealment screens.

2. The telecommunications network according to claim 1, wherein each of the directional antennas is fully or partially enclosed within a radome, which is either a spherical radome or a cylindrical radome, and wherein each spherical radome is fully rotatable in both an azimuthal direction and an elevational direction, and wherein each cylindrical radome is fully rotatable in either the azimuthal direction or the elevational direction, and wherein each radome is configured to aim each of directional antennas in a specified directional orientation.

3. The telecommunications network according to claim 1, wherein each of the IC boards is fully or partially enclosed within a radome, which is either a spherical radome or a cylindrical radome, and wherein each IC board is mounted on a gimbal, having at least two axes of rotation, such that each of the IC boards is rotatable through 360° in both an azimuthal and an elevational direction.

4. The telecommunications network according to claim 2, wherein each radome contains multiple directional antennas, each of which has a different directional orientation corresponding to a different coverage area.

5. The telecommunications network according to claim 3, wherein each radome contains multiple directional antennas, each of which has a different directional orientation corresponding to a different coverage area.

6. The telecommunications network according to claim 4, wherein at least one of the multiple directional antennas is exchangeable with one or more replacement antennas associated with different frequencies and/or coverage areas.

7. The telecommunications network according to claim 5, wherein at least one of the multiple directional antennas is exchangeable with one or more replacement antennas associated with different frequencies and/or coverage areas.

8. The telecommunications network according to claim 2, wherein at least one of the radomes is embedded in at least one of the concealment screens.

9. The telecommunications network according to claim 2, wherein the network nodes are point-to-point (PTP) nodes and/or point-to-multipoint (PTMP) nodes, and wherein the network nodes are configured in both azimuthal and elevational line-of-sight (LOS) relationship to one another, and wherein the directional antennas are LOS aimed between the nodes by rotation of the radomes or by rotation of the IC boards mounted on the gimbals.

10. The telecommunications network according to claim 8, wherein the network nodes are point-to-point (PTP) nodes and/or point-to-multipoint (PTMP) nodes, and wherein the network nodes are configured in both azimuthal and elevational line-of-sight (LOS) relationship to one another, and wherein the directional antennas are LOS aimed between the nodes by rotation of the radomes or by rotation of the IC boards mounted on the gimbals.

11. The telecommunications network according to claim 9, wherein the telecommunications network has multiple redundant fiber injection points, and wherein the network nodes are configured to re-route around network nodes that have failed or have become degraded.

12. The telecommunications network according to claim 10, wherein the telecommunications network has multiple redundant fiber injection points, and wherein the network nodes are configured to re-route around network nodes that have failed or have become degraded.

* * * * *